Feb. 8, 1927.
C. E. DOUGLAS
1,616,891
RIM JACK
Filed Oct. 29, 1925    2 Sheets-Sheet 1
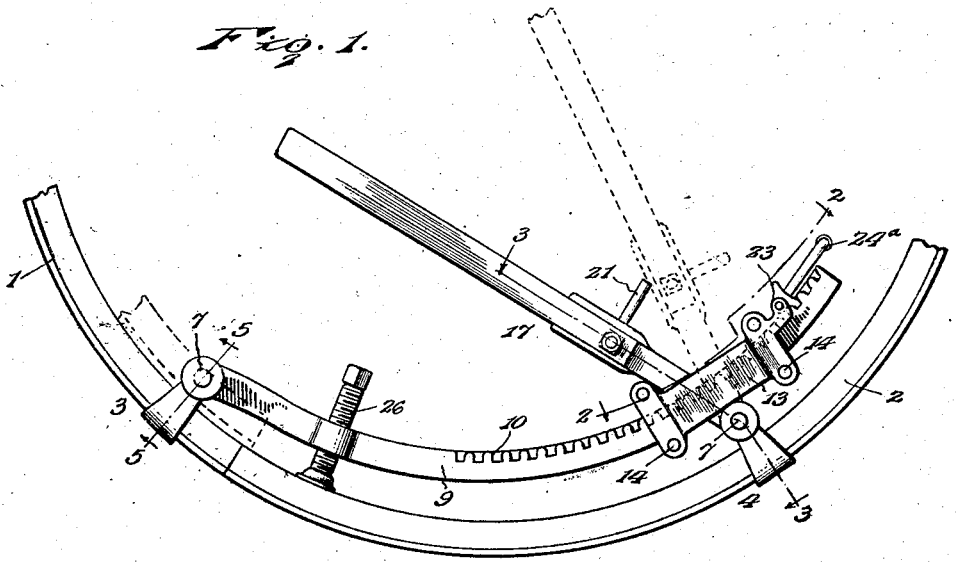
Inventor
C. E. Douglas.
By
Lacy & Lacy, Attorneys

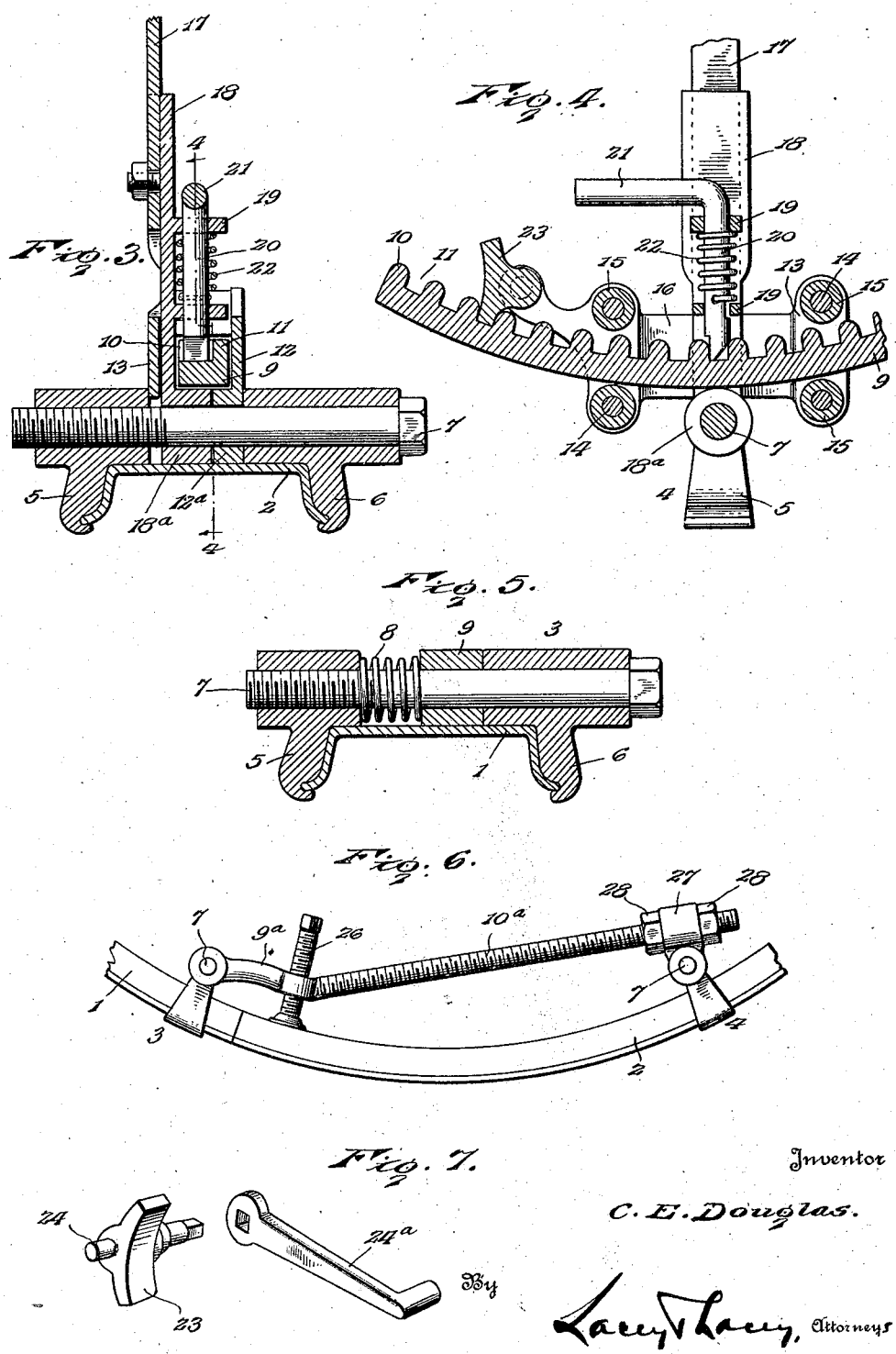

Patented Feb. 8, 1927.

1,616,891

UNITED STATES PATENT OFFICE.

CHARLES ELDON DOUGLAS, OF HOQUIAM, WASHINGTON.

RIM JACK.

Application filed October 29, 1925. Serial No. 65,611.

The invention relates to tools for use in connection with demountable split rims upon which the tires of motor vehicles are mounted and has for its primary object the provision of a tool to facilitate the collapsing and the expanding of a rim and which may be conveniently carried upon the vehicle, as an accessory for use upon the road and which is positive in action and susceptible of use by the average driver.

The invention further provides a tool embodying means for breaking the joint between the ends of a rim preliminary to collapsing the rim and including means for collapsing or expanding the rim as required in the mounting or the dismounting of a tire.

The invention also aims to provide a tool which is light, durable and capable of being readily fitted to the rim and disconnected therefrom and which enables the work of mounting and dismounting a tire to be performed with ease and a minimum amount of exertion and expenditure of effort.

While the drawings illustrate a preferred embodiment of the invention, it is to be understood that in adapting the means to meet specific needs and requirements the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which:

Figure 1 is a side view of a rim jack embodying the invention showing the same applied to end portions of a split rim, Figure 2 is an enlarged detail sectional view on the line 2—2 of Figure 1 looking in the direction of the arrows, Figure 3 is an enlarged detail sectional view on the line 3—3 of Figure 1 looking to the left is designated by the arrows, Figure 4 is a sectional view on the line 4—4 of Figure 3 looking to the left as indicated by the arrows, Figure 5 is an enlarged detail sectional view on the line 5—5 of Figure 1, looking in the direction of the arrows, Figure 6 is a view similar to Figure 1 of a modification, and Figure 7 is a detail perspective view of the reversible detent and operating handle therefor.

Corresponding and like parts are referred to in the following description and indicated in the several views of the drawings by like reference characters.

The numerals 1 and 2 designate the ends of a split rim to which the jack is attached when in active operation. Similar or like rim engaging clamps are provided for attaching the tool to the rim and these clamps are designated generally by the reference numerals 3 and 4 and each clamp consists of complemental jaws 5 and 6 and a connecting bolt 7. The bolt 7 passes loosely through the jaw 6 and has screw thread engagement with the jaw 5. An open helical spring 8 is mounted upon the bolt 7 of the clamp 3 and normally operates to press the jaws 5 and 6 apart. A member adjustably connects the rim clamps 3 and 4 and is of such construction as to admit of said clamps being drawn together or pressed apart accordingly as the rim is to be collapsed or expanded. For general application the member consists of a bar 9 which is curved throughout its length and which is pivotally mounted upon the bolt 7 of the clamp 3 and adjustable with reference to the clamp 4 and as shown, the curved bar 9 has an edge portion provided with teeth 10, the opposite edge portion being intact or smooth as indicated at 11 to insure a free sliding movement of the bar when adjusting the same forwardly or backwardly. The toothed portion 10 is adjacent the free end of the bar 9 and extends a sufficient distance to provide for ample movement in the operation of the tool.

A guide is pivotally mounted upon the bolt 7 of the clamp 4 and comprises elongated plates 12 and 13 which are disposed upon opposite sides of the bar 9 and which are properly spaced and connected by shouldered rivets 14 or analagous fastening means, said plates being formed with terminal extensions to receive the fastenings 14 and admit of the same being disposed above and below the bar 9 as indicated most clearly in Figure 4. Sleeves 15 are loosely mounted upon the fastenings 14 and constitute anti-friction rollers to minimize the friction incident to the movements of the bar 9 when adjusting the same. The plate 12 is flat whereas the plate 13 is laterally offset intermediate its ends as indicated most clearly at 16 in Figure 2, so as to accommodate a lever which is pivotally mounted upon the bolt 7 of the clamp 4. As indicated most clearly in Figure 3, the guide is pivotally mounted upon the bolt 7 by means of the plate 12 which is formed with an extension through which the bolt passes and this extension is reenforced by an inwardly disposed boss 12$^a$. The operating lever comprises a handle portion 17 and a shank 18, the latter having an inwardly disposed boss 18$^a$ through which the bolt 7 passes, the bosses 12$^a$ and 18$^a$ underlapping the bar 9 and properly spacing the lever to prevent binding of the bar 9 between the plate 12 and the shank 18. Lugs 19 project laterally from a side of the shank 18 in spaced relation and are apertured to receive a dog 20 which is provided with a handle 21, said dog being reversible to move the bar 9 positively in either direction. The inner end of the dog 20 is beveled to ride upon the teeth 10 and said dog is normally urged inwardly by means of a helical spring 20 mounted thereon between the lugs 19 and having an end portion extending through the dog as indicated most clearly in Figures 3 and 4.

A double ended detent 23 is pivotally mounted upon an end of the guide and is reversible to coact with the teeth 10 to hold the bar 9 against backward movement in either direction. A pivot 24 connects the detent with the guide and in the preferable construction forms a part of the detent and one end of the pivot is extended and receives a handle 24$^a$ which serves the dual purpose of reversing means for the detent and means to hold the detent in engagement with the teeth 10. The active ends of the detent 23 are oppositely disposed and the handle 24$^a$ is arranged at a right angle to the detent so as to function as a weight to hold the detent in the required adjusted position.

In the practical operation of the tool it is located upon the inner side of the rim opposite the split and the clamps 3 and 4 are adjusted so that the jaws engage opposite sides of the rim as indicated most clearly in Figures 3 and 5, the clamps being tightened by means of the bolts 7. The clamp 3 is located near the split of the rim whereas the clamp 4 is arranged some distance from the split, this being necessary to provide for movement of the end 1 upon the end 2 when collapsing the rim. A screw 26 is threaded into the bar 9 a short distance from the pivotal connection of the bar with the clamp 3, and this screw is adapted to engage the inner side of the end 2 of the rim, so that after the tool has been properly applied to the rim a turning of the screw 26 will cause its inner end to bear against the end 2 and move the end 1 inward so as to break the joint as indicated by the dotted lines in Figure 1. The lever 17 is now operated to move the bar 9 and advance the clamp 3 toward the clamp 4, thereby collapsing the rim. The lever 17 is operated by a rocking movement thereby advancing the bar 9 step by step, backward movement of the bar being prevented by the detent 23 as will be readily appreciated. After the rim has been sufficiently collapsed a tire may be placed in position thereon or removed therefrom, and after a tire has been mounted upon the rim the latter is expanded by reversing the detent 23 and the dog 22 and rocking the lever 17 which effects a reverse movement of the bar 9 and moves the clamp 3 away from the clamp 4, and when the end 1 reaches a position with its extremity opposite the split of the rim, the screw 26 is backed thereby permitting the alinement of the ends 1 and 2, after which the tool is removed and may be stored upon the vehicle as part of the tool kit.

In the modification shown in Figure 6, the member adjustably connecting the clamps 3 and 4 consists of a bar 9$^a$ pivotally mounted at one end upon the bolt 7 of the clamp 3 and having a portion screw threaded as indicated at 10$^a$ and passing loosely through a guide 27 pivotally mounted upon the bolt 7 of the clamp 4, the threaded portion of the bar receiving a pair of nuts 28 between which the guide 27 is clamped. The clamps 3 and 4 are drawn together or moved apart by proper manipulation of the nuts 28, the one being backed and the other advanced and vice versa. The bar 9$^a$ is provided with a screw 26 for a purpose hereinbefore stated. This form of jack is particularly designed for the rims of motor trucks which are heavy and require some considerable force to be exerted for their collapsing and expanding. The tool is operated in substantially the same manner as hereinbefore stated, the joint of the rim being disalined or broken by means of the screw 26 and the ends being drawn together or separated by manipulation of the nuts 28.

Having thus described the invention, what I claim is:

A rim tool comprising rim clamps, a bar pivoted at one end to one of the rim clamps and having a portion of its opposite end provided with teeth, a guide pivoted to the other rim clamp and comprising side plates, one of the plates being laterally offset intermediate its ends, means connecting the plates and engaging the top and the bottom sides of the said bar, an operating lever pivoted to the rim clamp associated with said guide and passing through the space formed between the said bar and the laterally offset portion of the guide, a reversible dog mounted upon the lever, a reversible detent mounted upon the guide, and a rim joint breaking device mounted upon the bar adjacent its pivotal end.

In testimony whereof I affix my signature.

CHARLES ELDON DOUGLAS. [L. S.]